H. Thompson,

Tackle Block.

No. 103687.    Patented May 31, 1870.

Witnesses,
H. A. Daniels
J. H. Meiter

H. Thompson  Inventor,
by Ch. Sidney Whitman
Washington D.C.
Att'y

N. PETERS, PHOTO-LITHOGRAPHER, WASHINGTON, D.C.

United States Patent Office.

HENRY THOMPSON, OF ROCKLAND, MAINE.

Letters Patent No. 103,687, dated May 31, 1870.

IMPROVEMENT IN TACKLE-HOOKS.

The Schedule referred to in these Letters Patent and making part of the same.

*To all whom it may concern:*

Be it known that I, HENRY THOMPSON, of Rockland, in the county of Knox and State of Maine, have invented a new and useful Improvement in Tackle-Hooks; and do hereby declare that the following description, taken in connection with the accompanying plate of drawings hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of hooks which is attached to blocks or pulleys; and The nature thereof consists in providing the said hook with a cleft-iron, by means of which it may be detached with facility from the object with which it is connected.

In the accompanying plate of drawings which illustrates my invention, and forms a part of the specification thereof, in which corresponding parts are illustrated by similar letters—

Figure 1:
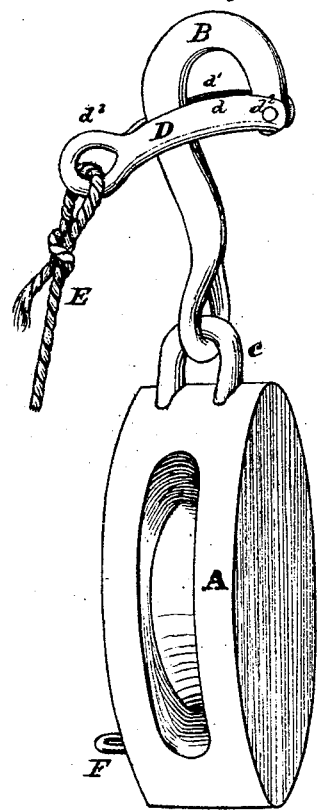
Figure 2:
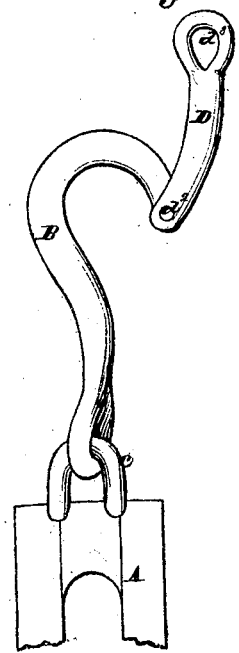

Figure 1 is a view, in perspective, of a hook and block of the ordinary form, with my invention applied thereto, and Figure 2 a vertical elevation of the same.

The construction, operation, and relative arrangement of the component parts of my invention are as follows, to wit:

To the block A is secured the hook B by means of the staple $c$. To the end of the said hook, which is provided with an aperture for that purpose, is pivoted the cleft-iron D.

The said cleft-iron consists of two prongs, $d$ and $d^1$, the ends of which are provided with perforations for the reception of the bolt $d^2$, by which they are pivoted as aforesaid, and the loop or eye $d^3$, to which is made fast the line E. The said line is passed through a staple, F, attached to the block A.

The hook may be connected to staples, pins, eyes, grummets, and devices of a like nature, in the ordinary manner, and may be detached therefrom with convenience and facility by hauling taut upon the line E, attached to the eye $d^3$, which causes the cleft-iron to assume the position represented in fig. 1, and thereby disconnect the hook from the object to which it is attached. If a fall or line has been rove through the sheave of the block, it will be necessary to slacken the same before disengaging the hook.

It is evident that my invention is equally applicable to double blocks, snatch-blocks, and other similar devices and appliances.

I am aware that tripping lines and detaching levers have been heretofore applied to tackle-blocks, and, therefore, do not claim the same, either severally or in combination, or irrespectively of the peculiar arrangement thereof described; but

I claim and desire to secure by Letters Patent—

The arrangement of the curvilinear cleft-iron, constructed of a single piece of metal, the hook, the tripping line, and the staple attached to the block through which the tripping line is lead, when constructed and jointly operating as and for the purposes described.

HENRY THOMPSON.

Witnesses:
ALLEN THOMPSON,
CHARLES A. HENDERSON.